United States Patent
Kawai

(10) Patent No.: US 7,155,604 B2
(45) Date of Patent: Dec. 26, 2006

(54) GAME SYSTEM HAVING SELECTABLE STARTUP DISPLAY IMAGE WHEREIN SYSTEM PROCESSOR SELECTS BETWEEN INTERNAL DISPLAY IMAGE OR DISPLAY IMAGE FROM EXTERNAL MEMORY CARD

(75) Inventor: Eiji Kawai, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/364,638

(22) Filed: Jul. 30, 1999

(65) Prior Publication Data

US 2003/0154367 A1 Aug. 14, 2003

(30) Foreign Application Priority Data

Jul. 31, 1998 (JP) .................. 10-218296

(51) Int. Cl.
*G06F 17/00* (2006.01)
*G06F 19/00* (2006.01)
*A63F 9/00* (2006.01)
*A63F 9/24* (2006.01)

(52) U.S. Cl. .............. 713/2; 713/1; 713/100; 463/41; 463/42; 463/43; 463/44; 463/45

(58) Field of Classification Search .......... 713/1, 713/2, 100; 468/38, 41, 45, 1, 29, 47; 463/41–45
See application file for complete search history.

(56) References Cited

U.S. PATENT DOCUMENTS

| 4,663,707 A | 5/1987 | Dawson ............... 713/2 |
| 5,093,915 A | 3/1992 | Platteter et al. ........ 713/2 |
| 5,471,674 A | 11/1995 | Stewart et al. ......... 713/2 |
| 5,624,316 A * | 4/1997 | Roskowski et al. ..... 463/45 |
| 5,762,555 A * | 6/1998 | Crump et al. ......... 463/41 |
| 5,785,598 A * | 7/1998 | Hsu ................... 463/44 |
| 5,984,785 A * | 11/1999 | Takeda et al. .......... 463/38 |
| 6,240,519 B1 * | 5/2001 | James et al. .......... 713/202 |
| 6,743,103 B1 * | 6/2004 | Sugimura ............. 463/43 |

FOREIGN PATENT DOCUMENTS

| EP | 0 431 723 | 6/1991 |
| EP | 0 726 518 | 8/1996 |
| EP | 0 844 554 | 2/1998 |
| GB | 1 548 497 | 7/1979 |
| GB | 2 101 858 | 1/1983 |
| JP | 04-135746 | 4/1992 |
| JP | 05-40637 | 2/1993 |
| JP | 06-214670 | 8/1994 |
| JP | 06-314609 | 12/1994 |
| JP | 06-348504 | 12/1994 |
| JP | 08-171488 | 7/1996 |

* cited by examiner

Primary Examiner—Tammara Peyton
(74) Attorney, Agent, or Firm—Frommer Lawrence & Haug LLP; William S. Frommer; Thomas F. Presson

(57) ABSTRACT

There is disclosed a method of starting up an information processing apparatus which is capable of introducing a variety of elements into an image that is displayed when the information processing apparatus is started up according to a boot sequence. A memory card comprises a flash memory for storing boot data to be executed according to a boot sequence of the information processing apparatus, and a CPU having a transmitting function to transmit the boot data from the flash memory to the information processing apparatus and a control function to manage data. The boot data comprises a startup image display program for displaying a startup image when the information processing apparatus is started up, or its startup image data.

24 Claims, 10 Drawing Sheets

GAME SYSTEM HAVING SELECTABLE STARTUP DISPLAY IMAGE WHEREIN SYSTEM PROCESSOR SELECTS BETWEEN INTERNAL DISPLAY IMAGE OR DISPLAY IMAGE FROM EXTERNAL MEMORY CARD

BACKGROUND OF THE INVENTION

1. Field of the Invention

The present invention relates to a method of starting up an information processing apparatus by executing programs according to a boot sequence to perform a startup process, a recording medium removably insertable into an information processing apparatus, for storing various items of data, and an information processing apparatus into which a recording medium for storing various items of data can be removably inserted.

2. Description of the Related Art

There have in recent years been developed home video game machines for playing video games by executing a game application stored in a recording medium such as a CD-ROM or the like.

When such a home video game machine or a personal computer is turned on or hard-reset, it is initialized according to a boot sequence. For example, processes that are required to start up the apparatus are performed by various programs according to the boot sequence.

Among the programs that are executed according to the boot sequence is a program for displaying an image of game characters, characters (letters and numerals), etc. on a display screen. Many images that are displayed according to such a program often reflect various aspects of life.

The program that is executed according to the boot sequence to display the image is controlled by a boot ROM or an OS that is incorporated in the apparatus. Therefore, the program cannot be replaced or modified unless the apparatus or the OS is upgraded.

Unless the above program is changed, the apparatus is unable to display an image that reflects advances in technology, the passage of time, current topics, and various events.

Heretofore, one image is displayed at all times upon a startup of the apparatus according to the boot sequence. Another problem is that since the same image is displayed of necessity even when a different application is executed, the user tends to becomes bored with the displayed startup image.

SUMMARY OF THE INVENTION

It is therefore an object of the present invention to provide a method of starting up an information processing apparatus, a recording medium, and an information processing apparatus, which are capable of introducing a variety of elements into a startup image that is displayed when the information processing apparatus is started up according to a boot sequence.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

The principles of the present invention are particularly useful when embodied in an information processing system for processing various data. Such an information processing system will be described in detail below with reference to the drawings.

Figure 1:
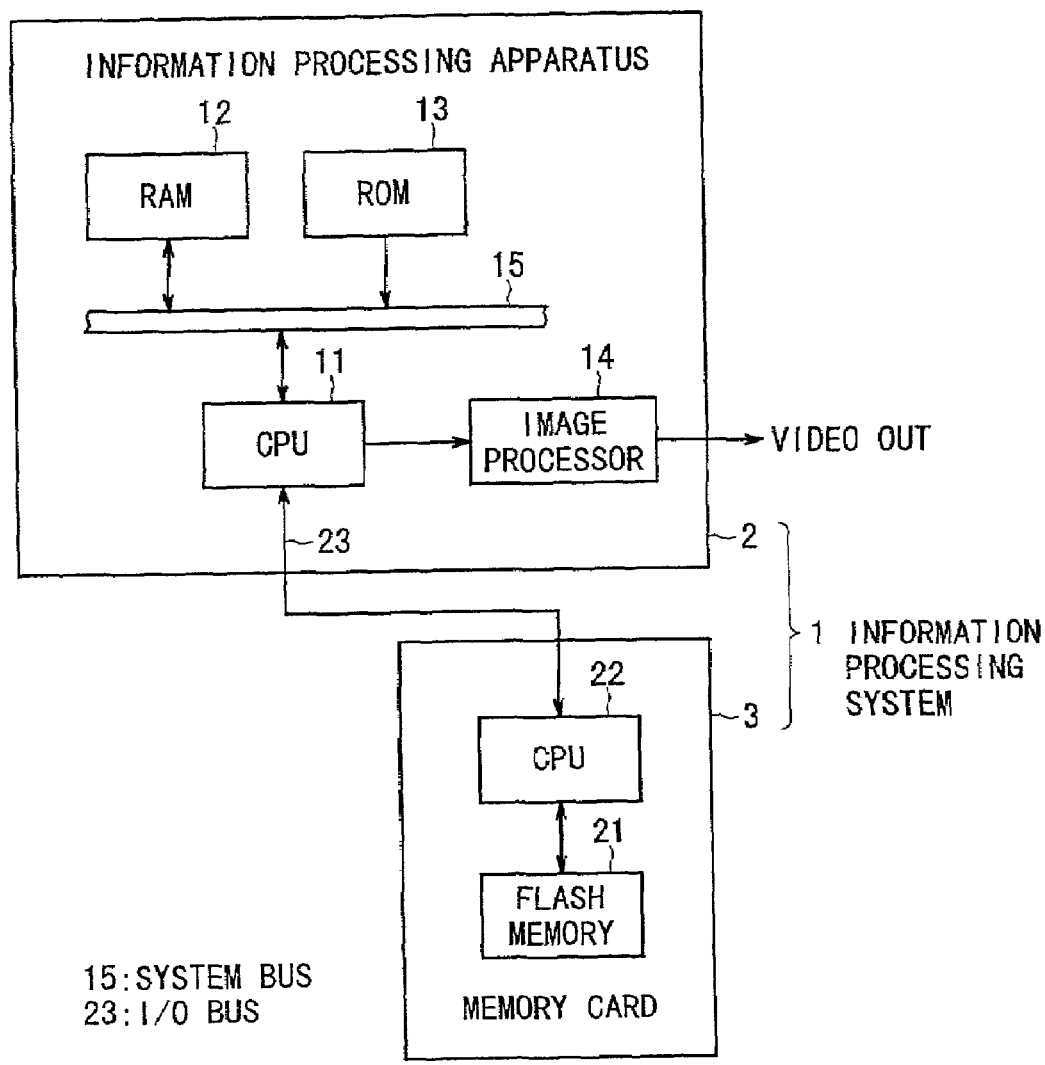
FIG. 1 is a block diagram of an information processing system which comprises an information processing apparatus and a memory card according to the present invention.

As shown in FIG. 1, an information processing system 1 comprises an information processing apparatus 2 for processing various data and a memory card 3 as a recording medium which is removably insertable into the information processing apparatus 2.

The information processing apparatus 2 comprises a CPU 11 having a reading function to read boot data, i.e., data to be executed upon booting, from the memory card 3 and a booting function to execute the boot data read from the memory card 3 according to a boot sequence, and a RAM 12 serving as a boot data storage means for storing the boot data read from the memory card 3 and a transmission data storage means for storing transmission data.

The information processing apparatus 2 also has a ROM 13 serving as a boot execution storage means for storing the boot data to be executed according to the boot sequence as invariable boot data, and an image processor 14 for processing image data.

The CPU 11, the RAM 12, and the ROM 13 are interconnected by a bus 15.

The information processing apparatus 2 further includes an interface (not shown) as an external connection port for interfacing the memory card 3 that is inserted into the information processing apparatus 2.

The information processing apparatus 2 may be in the form of a video game apparatus for playing a video game according to an application program or a personal computer for processing various data.

The memory card 3 comprises a flash memory 21 as a storage means for storing boot data to be executed according to a boot sequence of the information processing apparatus 2 when the information processing apparatus 2 is booted, and a CPU 22 as a control means having a transmitting function to transmit the boot data from the flash memory 21 to the information processing apparatus 2 and a control function to manage data.

The memory card 3 also has an interface (not shown) for interfacing the information processing apparatus 2 when the memory card 3 is inserted in the information processing apparatus 2. The interface serves as a transmitting means having a transmitting function to transmit the boot data from the flash memory 21 to the information processing apparatus 2.

The information processing apparatus 2 executes the boot data stored in and read from the memory card 3 according to the boot sequence when the information processing apparatus 2 is started up or hard-reset.

The information processing apparatus 2 and the memory card 3, which make up the information processing system 1, will hereinafter be described in detail below.

The flash memory 21 in the memory card 3 is a storage means comprising a nonvolatile memory for storing various data. Specifically, the flash memory 21 holds the boot data used by the information processing apparatus 2 and data used by application programs executed by the information processing apparatus 2. The flash memory 21 may comprise a flash EEPROM (electrically erasable programmable read-only memory), for example.

The boot data is data or a program which is initially used at startup when the information processing apparatus 2 is started up or hard-reset, and is executed according to the boot sequence. The flash memory 21 stores as the boot data an OSD (On Screen Display) program or image data used by the OSD program, as a startup image display program or data for displaying image information and character information when the information processing apparatus 2 is started up. Specifically, the information processing apparatus 2 can display an image or characters on a display unit such as a display monitor or the like when the information processing apparatus 2 is started up, by using the OSD program (hereinafter referred to as a startup image display program) or the image data used thereby.

Figure 2:
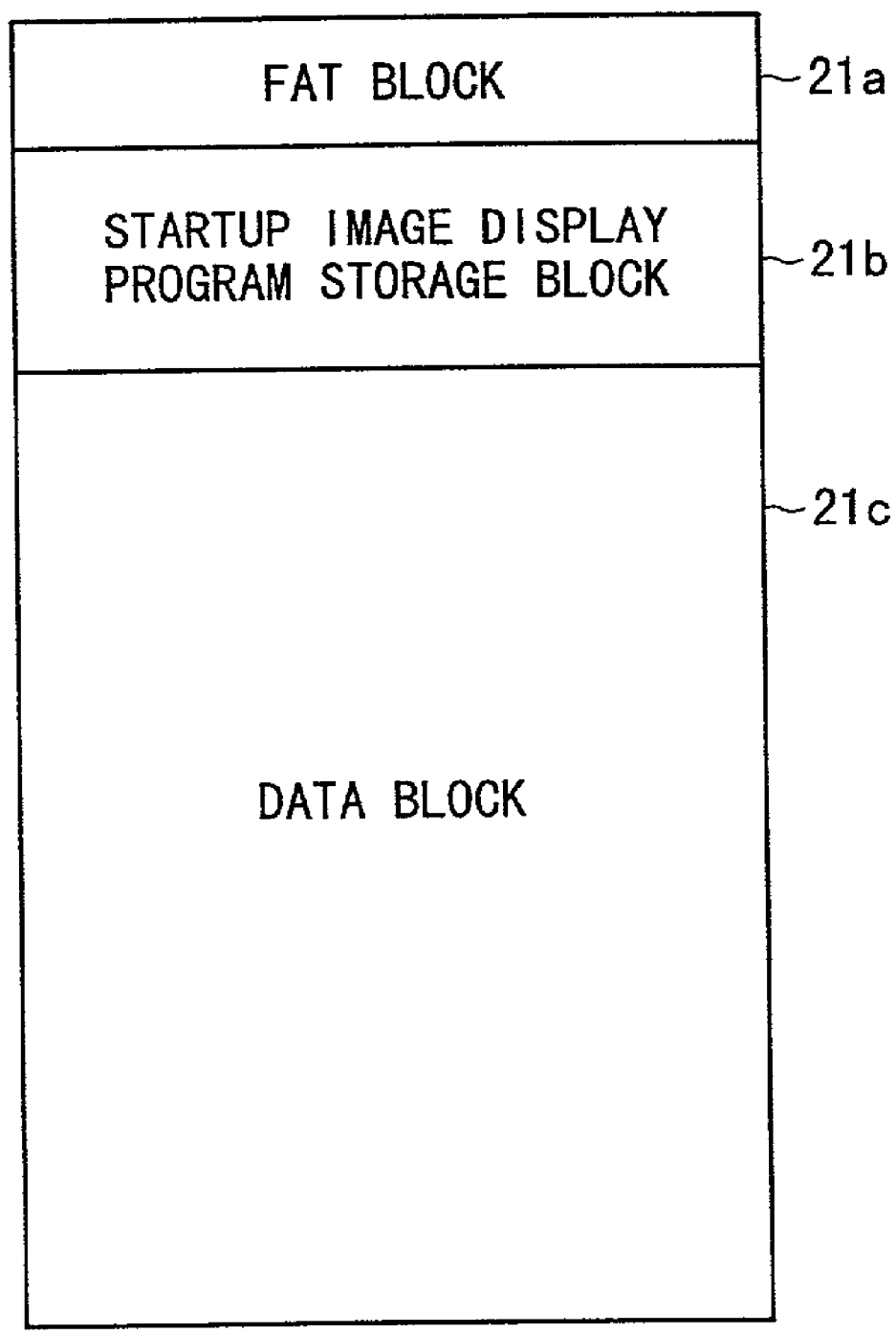
FIG. 2 is a diagram showing a data area of a flash memory of the memory card.

The flash memory 21 has a data storage area which comprises, as shown in FIG. 2, a FAT (File Allocation Table) block 21a, a startup image display program storage block 21b, and a data block 21c.

The FAT block 21a is an area which stores header information, etc. of data held by the flash memory 21.

The startup image display program storage block 21b is an area which stores the startup image display program that is used by the information processing apparatus 2 according to the boot sequence, and the image data used to display images according to the startup image display program. Specifically, the startup image display program stored in the startup image display program storage block 21b is arranged as an extended version of the OSD, i.e., an extended OSD, as viewed from a startup image display program originally stored in the information processing apparatus 2. The startup image display program storage block 21b does not allow any data to be written therein.

The data block 21c is an area which stores various data. For example, the data block 21c stores data related to the information processing apparatus 2 which is a data supply source. Specifically, the data block 21c stores data generated by the information processing apparatus 2.

In conventional memory cards, all areas other than the FAT block 21a are assigned as data blocks. Therefore, the conventional memory cards do not have the startup image display program storage block 21b according to the present invention.

As described above, the CPU 22 has the transmitting function to transmit the startup image display program or its image data from the flash memory 21 to the information processing apparatus 2. The CPU 22 also has the control function to manage data.

When the CPU 22 is connected to the information processing apparatus 2, the CPU 22 transfers the startup image display program or its image data from the flash memory 21 to the information processing apparatus 2 via an I/O bus 23 that includes the interfaces (not shown).

The information processing apparatus 2 will be described in detail below.

The RAM 12 is arranged as a storage means for storing various data. The RAM 12 stores the startup image display program which is the boot data read from the memory card 3.

The ROM 13 is arranged as a boot ROM which stores the boot data to be executed according to the boot sequence as invariable boot data.

The boot data is a program or data that is initially started up when the information processing apparatus 2 is turned on or hard-reset, and executed according to the boot sequence. The ROM 13 stores as the boot data various programs for system initialization, i.e., testing hardware resources, initializing registers, and checking application programs for their genuineness.

The ROM 13 also stores the startup image display program or the image data used thereby as the boot data. However, the programs and data that are stored in the ROM 13 when it is assembled at and shipped from the factory cannot be rewritten, i.e., modified, in the field. While some of the functions of the startup image display program are performed by the OS (operating system) in certain video game machines and personal computers, the program details cannot be updated in the field unless the OS is changed. For example, when the information processing apparatus 2 is turned on or hard-reset, a startup image is displayed according to the startup image display program and startup image data which are stored in the ROM 13. The same startup image is always displayed when the information processing apparatus 2 is turned on or hard-reset, unless the hardware or OS is upgraded.

The ROM 13 also stores a program for checking whether the memory card 3 is inserted in the information processing apparatus 2 and a program for checking whether the memory card 3 is compatible with the extended OSD or not, i.e., it stores the startup image display program, or not.

The image processor 14 processes image data and outputs a video image representing processed image data.

The CPU 11 serves as a control means for controlling various components of the information processing apparatus 2. As described above, the CPU 11 has a reading function to read the boot data from the memory card 3 and a booting function to execute the boot data read from the memory card 3 according to the boot sequence.

When the memory card 3 is inserted in the information processing apparatus 2, the CPU 11 reads various data, e.g., the boot data, from the memory card 3 via the I/O bus 23 that includes the interfaces (not shown).

To the I/O bus 23, there are connected an accessory, an adapter, etc., such as the memory card 3.

The information processing apparatus 2 further includes a sound processor for processing and outputting an audio signal, a CD-ROM drive, a hard disk drive, and a floppy disk drive for reading application programs stored in a CD-ROM, a hard disk, and a floppy disk, respectively.

The memory card 3 and the information processing apparatus 2 which are constructed as described above jointly make up the information processing system 1.

In the information processing system 1, the memory card 3 stores the startup image display program in the startup image display program storage block 21b as an area of the flash memory 21. When the information processing apparatus 2 with the memory card 3 connected thereto is booted, i.e., turned on or hard-reset, a startup image is displayed according to the startup image display program stored in the memory card 3.

Figure 3:
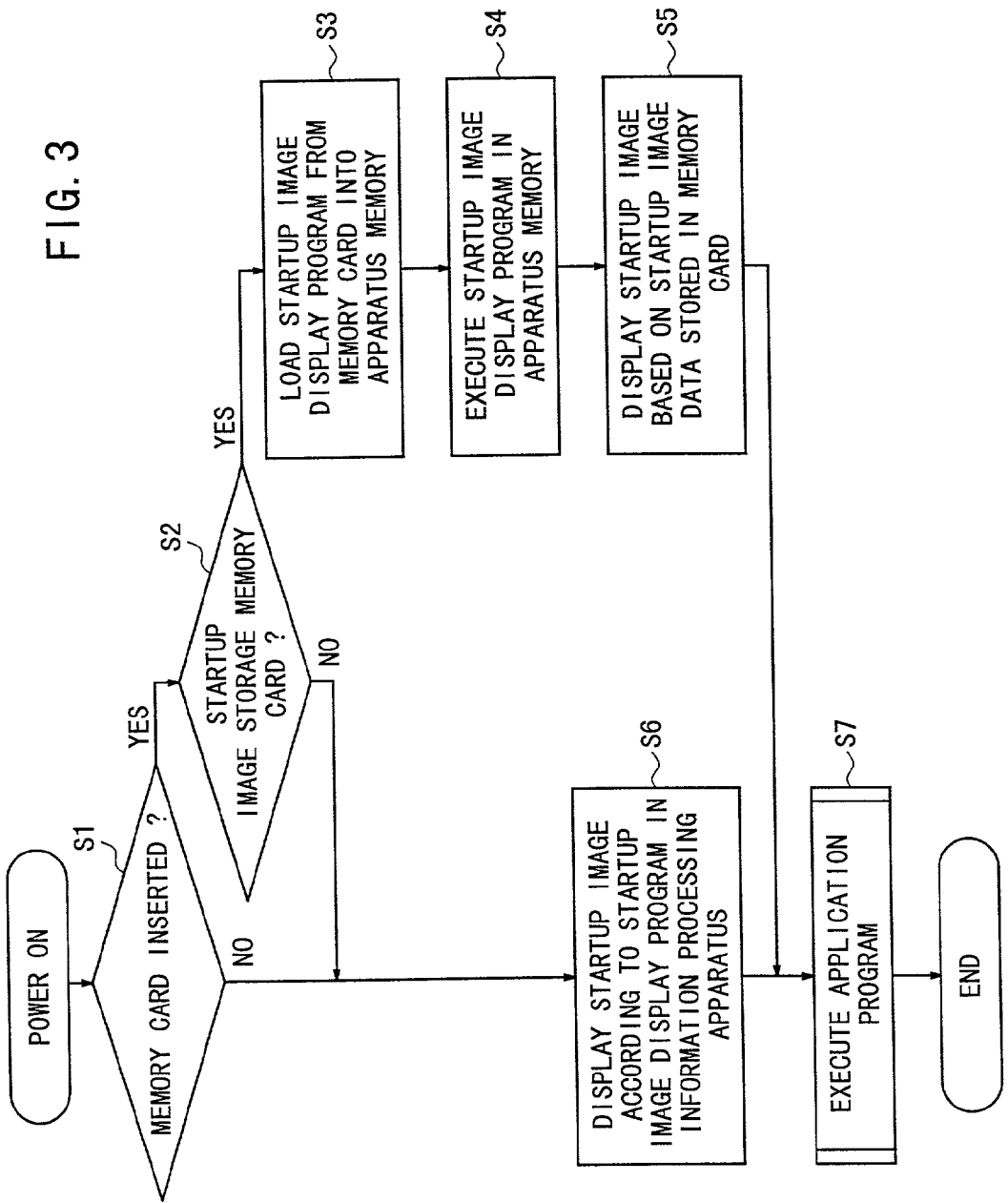
FIG. 3 is a flowchart of a processing sequence for the information processing apparatus to read a startup image display program from the memory card and display a startup image according to the startup image display program thus read.
Figure 4:
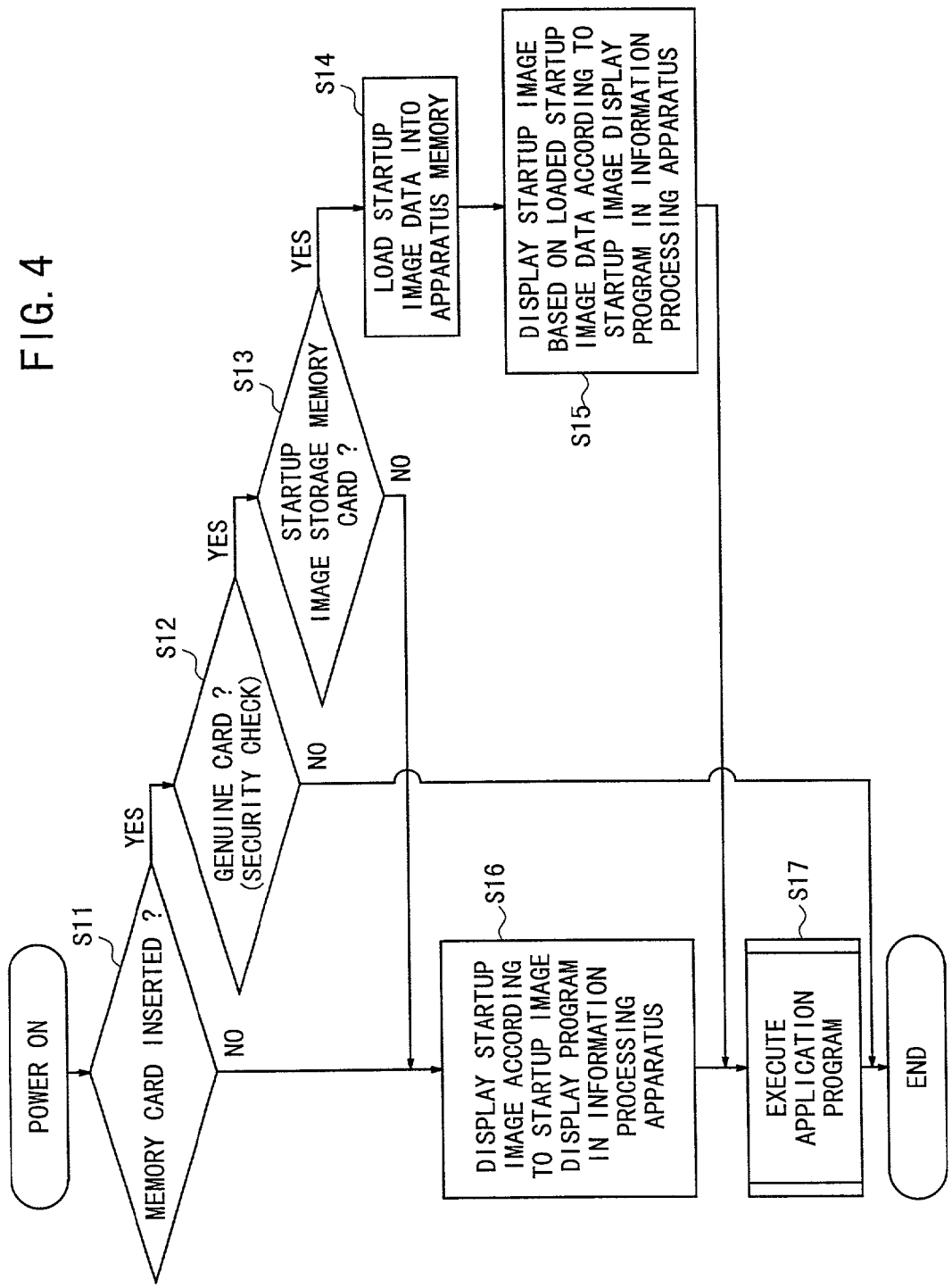
FIG. 4 is a flowchart of a processing sequence for the information processing apparatus to read startup image data from the memory card and display a startup image according to the startup image data thus read.

Processes of displaying the startup image when the information processing apparatus 2 with the memory card 3 connected thereto is turned on will be described below with reference to FIGS. 3 and 4. FIG. 3 shows a processing sequence for the information processing apparatus 2 to load the startup image display program itself from the memory card 3, and FIG. 4 shows a processing sequence for the information processing apparatus 2 to load only image data (hereinafter referred to as startup image data) used by the startup image display program to display a startup image from the memory card 3. The information processing apparatus 2 executes either one of the above processing sequences when it is booted, i.e., when it is turned on or hard-reset.

The processing sequence shown in FIG. 3 will first be described below. In step S1, the information processing apparatus 2 decides whether the memory card 3 is inserted therein or not. If the memory card 3 is inserted in the information processing apparatus 2, then control goes to step S2. If the memory card 3 is not inserted in the information processing apparatus 2, then control goes to step S6.

In step S2, the information processing apparatus 2 decides whether the inserted memory card 3 is a memory card which stores the startup image display program (hereinafter referred to as a startup image storage memory card) or not.

If the inserted memory card 3 is a startup image storage memory card, then control proceeds to step S3. If the inserted memory card 3 is not a startup image storage memory card, then control goes to step S6.

In step S3, the information processing apparatus 2 loads the startup image display program from the startup image storage memory card into the RAM 12. In next step S4, the information processing apparatus 2 executes the startup image display program stored in the RAM 12. The information processing apparatus 2 displays a startup image on a display monitor or the like based on the startup image data in step S5.

The startup image data based on which the startup image is displayed is loaded, together with the startup image display program, from the memory card 3 into the RAM 12. The startup image is displayed on the basis of either the startup image data thus stored in the RAM 12 or the startup image data stored in the memory card 3.

After the startup image is displayed, the information processing apparatus 2 starts executing an application program in step S7.

If the memory card 3 is not inserted in the information processing apparatus 2 in step S1 or if the inserted memory card 3 is not a startup image storage memory card in step S2, then the information processing apparatus 2 displays a startup image according to the startup image display program which is originally stored in the information processing apparatus 2 in step 6. Heretofore, when the information processing apparatus 2 is booted, a startup image is displayed according to the startup image display program which is originally stored in the information processing apparatus 2. After the startup image is displayed according to the startup image display program which is originally stored in the information processing apparatus 2 in step S6, the information processing apparatus 2 starts executing an application program in step S7.

According to the processing sequence shown in FIG. 3, therefore, the startup image display program is read from the startup image storage memory card inserted in the information processing apparatus 2, and the startup image is displayed according to the startup image display program thus read.

The processing sequence shown in FIG. 4 will be described below. In the processing sequence shown in FIG. 4, only startup image data stored in the memory card 3 is read and executed. The processing sequence shown in FIG. 4 also checks whether the inserted memory card 3 is genuine or not.

In step S11, the information processing apparatus 2 decides whether the memory card 3 is inserted therein or not. If the memory card 3 is inserted in the information processing apparatus 2, then control goes to step S12. If the memory card 3 is not inserted in the information processing apparatus 2, then control goes to step S16.

In step S12, the information processing apparatus 2 checks whether the inserted memory card 3 is a genuine card or not. For example, the information processing apparatus 2 carries out a security check in step S12. If the inserted memory card 3 is a genuine card, then control proceeds to step S13. If the inserted memory card 3 is not a genuine card, then the process of displaying the startup image is finished. For example, the information processing apparatus 2 carries out an error process.

In step S13, the information processing apparatus 2 decides whether the inserted genuine memory card 3 is a startup image storage memory card or not. If the inserted memory card 3 is a startup image storage memory card, then control proceeds to step S14. If the inserted memory card 3 is not a startup image storage memory card, then control goes to step S16.

In step S14, the information processing apparatus 2 loads only startup image data from the startup image storage memory card. In next step S15, the information processing apparatus 2 executes the startup image display program originally stored therein for thereby displaying a startup image on the display monitor or the like based on the startup image data loaded in step S14. Specifically, in steps S14 and S15, the information processing apparatus 2 replaces the startup image data originally stored therein with the startup image data read from the memory card 3, and displays the startup image based on the read startup image data.

After the startup image is displayed, the information processing apparatus 2 starts executing an application program in step S17.

If the memory card 3 is not inserted in the information processing apparatus 2 in step S11 or if the inserted memory card 3 is not a startup image storage memory card in step S13, then the information processing apparatus 2 displays a startup image according to the startup image display program which is originally stored in the information processing apparatus 2 in step S16. Heretofore, when the information processing apparatus 2 is booted, a startup image is displayed according to the startup image display program which is originally stored in the information processing apparatus 2.

After the startup image is displayed according to the startup image display program which is originally stored in the information processing apparatus 2 in step S16, the information processing apparatus 2 starts executing an application program in step S17.

According to the processing sequence shown in FIG. 4, therefore, a check is carried out to ascertain whether a genuine memory card is inserted or not, and only the startup image data is read from the memory card 3 inserted in the information processing apparatus 2 to display the startup image.

The process shown in FIG. 3 or 4 enables the information processing apparatus 2 to display the startup image according to the startup image display program or the startup image data stored in the memory card 3 which is the startup image storage memory card.

As described above, in the information processing system 1, the memory card 3 stores boot data such as a startup image display program and startup image data, and the information processing apparatus 2 executes the startup image display program and the startup image data according to a boot sequence when the information processing apparatus 2 is started up.

In the conventional information processing apparatus, programs used when it is booted are stored as all boot software in a boot ROM, and hence perform a constant startup procedure at all times when the conventional information processing apparatus is booted. However, the information processing system 1 according to the present invention is capable of producing an increased number of startup variations. Specifically, the information processing system 1 can produce many different startup variations by holding a different type of boot data in the memory card 3. For example, the information processing system 1 can display various startup images when it is booted.

Because the boot data is stored in and loaded from the memory card 3, programs that are executed when the information processing system 1 is booted can be upgraded, allowing the user to effect easy maintenance on field boot programs for an improved security function, for example, even after the hardware of the information processing system 1 has been shipped from the factory.

It is possible to update only a startup image without directly affecting the booting function, so that the startup image displayed when the information processing system 1 is turned on can be refreshed regardless of the fact that the hardware of the information processing system 1 remains the same.

The startup image may be changed so as to reflect seasons, topics, and events, and also to provide marketing effects including novelties, advertisements, and prizes. Since the startup image display program is necessarily executed when the information processing system 1 is started up, if the startup image contains an advertisement, then its commercial effect is considerably large.

In the above embodiment, the boot data has been described as startup image data. However, the boot data may be sound data to produce a startup sound when the information processing system 1 is turned on.

In the above embodiment, the boot data is loaded from the memory card 3 into the information processing apparatus 2, and the information processing apparatus 2 is booted using the boot data as a booting program. However, the information processing apparatus 2 may start a booting procedure according to the startup image display program and startup image data which are still stored in the memory card 3, for thereby displaying a startup image.

In the above embodiment, the boot data stored in the memory card 3 is read from the memory card 3 when the information processing apparatus 2 is booted, e.g., started up. However, the boot data stored in the memory card 3 may not be read each time the information processing apparatus 2 is started up, but when the information processing apparatus 2 is booted while the memory card 3 is being inserted therein, the boot data that has already been read from the memory card 3 may be used to display a startup image.

Specific arrangements of the information processing system 1 will be described below. FIGS. 5 through 9 show the information processing system 1 as it is applied to a video entertainment system having a video game apparatus 301. The video game apparatus 301 corresponds to the information processing apparatus 2.

Figure 5:
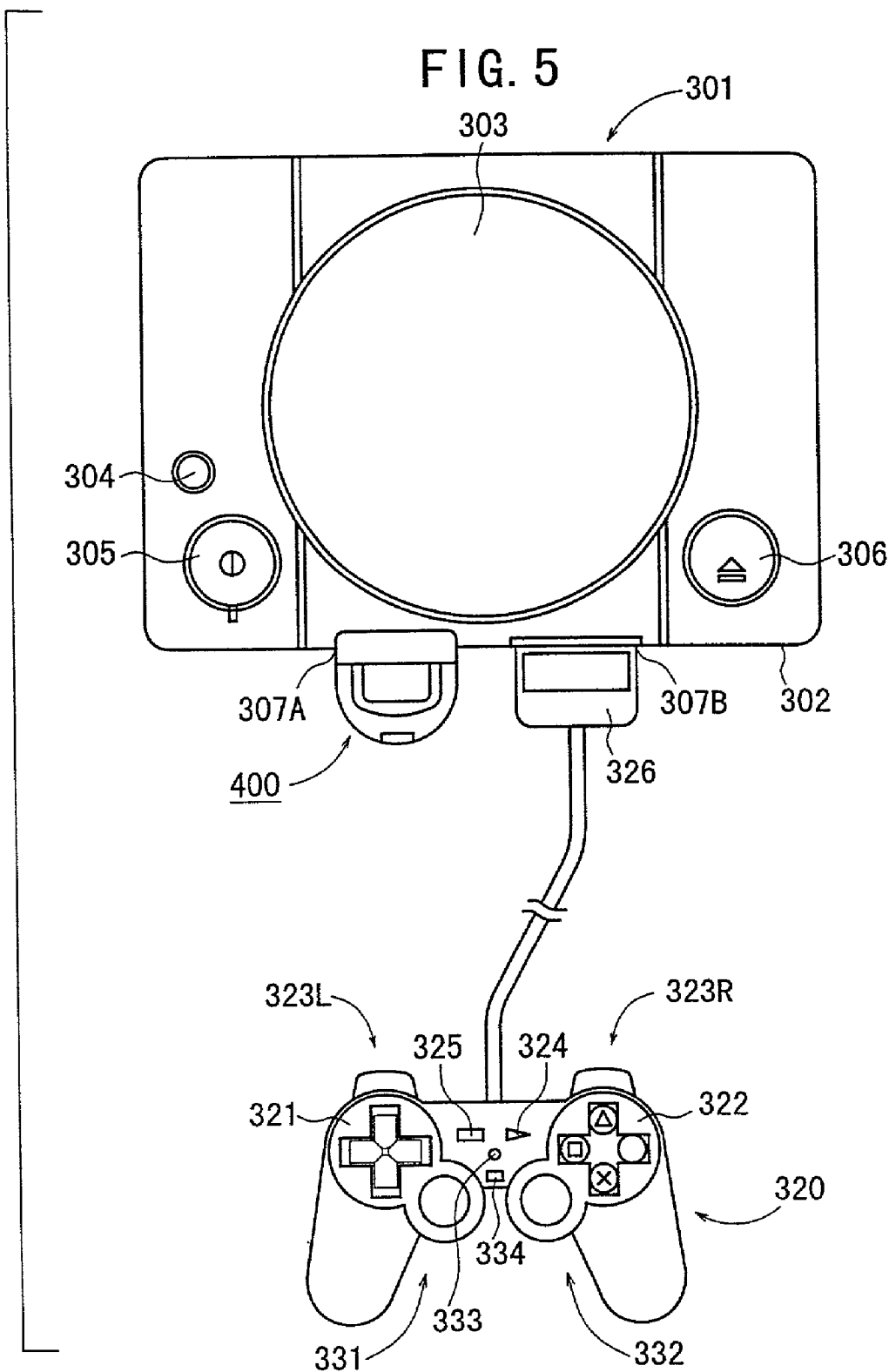
FIG. 5 is a plan view of a specific example of the information processing system, which is constructed as a video entertainment system comprising a video game apparatus and a portable electronic device.
Figure 6:
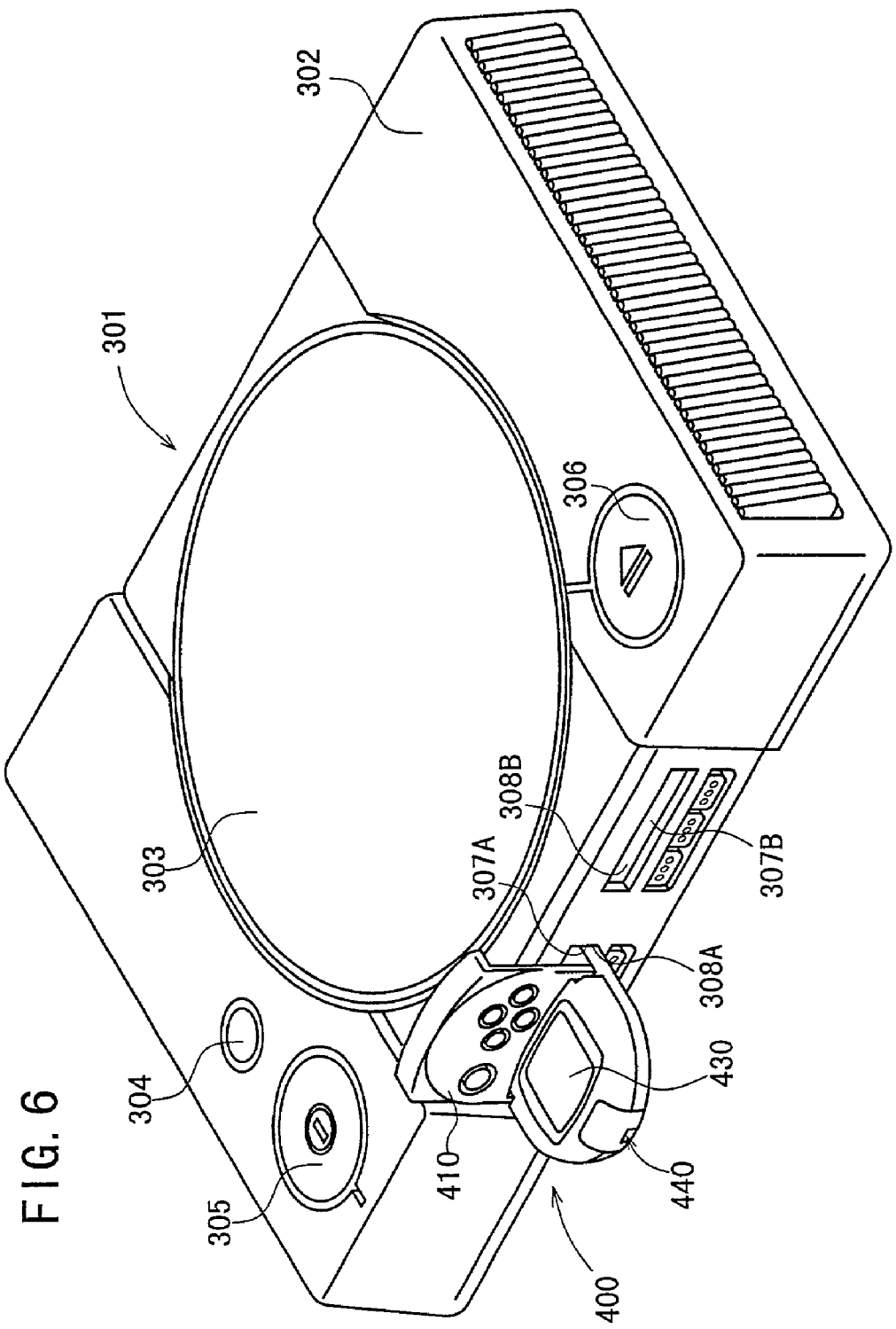
FIG. 6 is a perspective view of the video entertainment system shown in FIG. 5.

As shown in FIGS. 5 and 6, the video entertainment system comprises a video game apparatus 301 and a portable electronic device 400 removably inserted in the video game apparatus 301 for data communication therewith. The video game apparatus 301 serves as a master unit, and the portable electronic device 400 as a slave unit. For example, the video game apparatus 301 is arranged as a means for executing a game program stored in a recording medium such as a CD-ROM, and the portable electronic device 400 as a means for receiving data transmitted by a broadcast.

As shown in FIGS. 5 and 6, the video game apparatus 301 reads an application program from the recording medium, and executes the application program according to instructions from the user, i.e., the game player. For example, the video game apparatus 301 executes a game program mainly to proceed with a game, display game images, and output sounds.

The video game apparatus 301 has a rectangular casing 302 which houses a disk loading unit 303 substantially centrally therein for loading an optical disk such as a CD-ROM or the like as a recording medium for supplying an application program such as a game program or the like. The casing 302 supports a reset switch 304 for voluntarily resetting a video game, a power supply switch 305, a disk control switch 306 for controlling the loading of the optical disk, and two slots 307A, 307B.

The video game apparatus 301 may be supplied with an application program via a communication link, rather than being supplied from the recording medium.

The portable electronic device 400 and a manual controller 320 can be connected to the slots 307A, 307B.

The memory card 3 which stores the startup image display program and startup image data may also be connected to the slots 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode. The manual controller 320 also has a vibration imparting mechanism (not shown) disposed therein for imparting vibrations to the manual controller 320 depending on how the video game proceeds.

The manual controller 320 is electrically connected to the slot 307B in the casing 302 by a connector 326.

If two manual controllers 320 are connected respectively to the slots 307A, 307B, two users or game players can share the video entertainment system to play a competition game, for example. The video game apparatus 301 may have more or less than two slots 307A, 307B.

Figure 7:
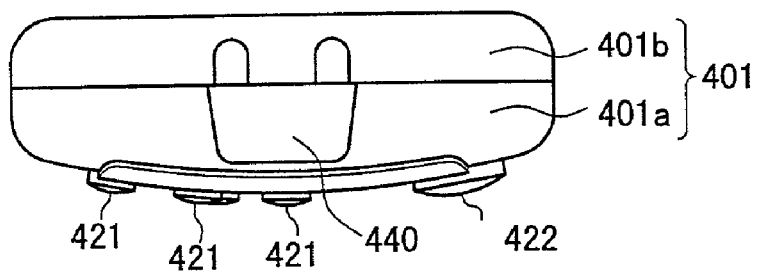
FIG. 7 is a plan view of the portable electronic device shown in FIG. 5.
Figure 8:
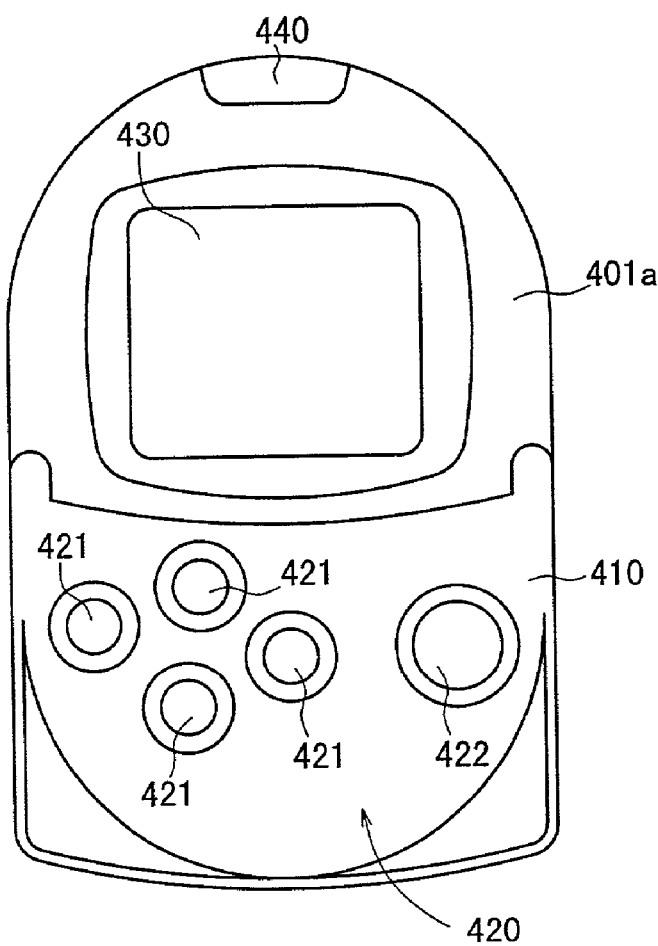
FIG. 8 is a front elevational view of the portable electronic device shown in FIG. 5.
Figure 9:
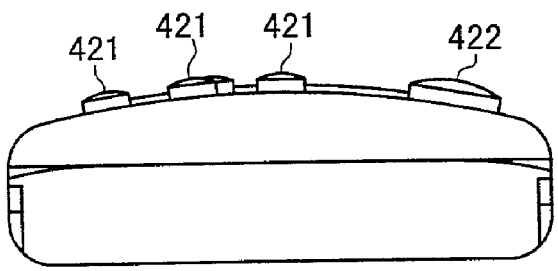
FIG. 9 is a bottom view of the portable electronic device shown in FIG. 5.

As shown in FIGS. 7, 8, and 9, the portable electronic device 400 has a housing 401 which supports a manual control pad 420 for entering various items of information, a display unit 430 such as a liquid crystal display (LCD) unit or the like, and a window 440 for wireless communication such as infrared communication with a wireless communication command unit.

The housing 401 comprises an upper shell 401a and a lower shell 401b, and houses a board which supports memory devices, etc. thereon. The housing 401 is shaped so as to be insertable into either one of the slots 307A, 307B in the casing 302.

The window 440 is mounted on a substantially semicircular end of the housing 401. The display unit 430 occupies a substantially half area of the upper shell 401a of the housing 401, and is positioned near the window 440.

The manual control pad 420 has a plurality of control buttons 421, 422 for entering events and making various selections. The manual control pad 420 occupies the other substantially half area of the upper shell 401a, and is positioned remotely from the window 440. The manual control pad 420 is disposed on a lid 410 that is angularly movably supported on the housing 401. The control buttons 421, 422 extend through the lid 410 from its upper surface to its lower surface. The control buttons 421, 422 are supported on the lid 410 for movement into and out of the upper surface of the lid 410.

The portable electronic device 400 has a board disposed in the housing 410 and facing the lid 410 as it is closed over the housing 401. The board supports a plurality of switch pressers held in alignment with the respective control buttons 421, 422 when the lid 410 is closed over the housing 401. When one of the control buttons 421, 422 is pressed by the user, it actuates the corresponding switch presser to press a pressure switch such as a diaphragm switch, for example.

As shown in FIG. 6, the portable electronic device 400 with the lid 410 being open is inserted into the slot 307A in the casing 302 of the video game apparatus 301.

Figure 10:
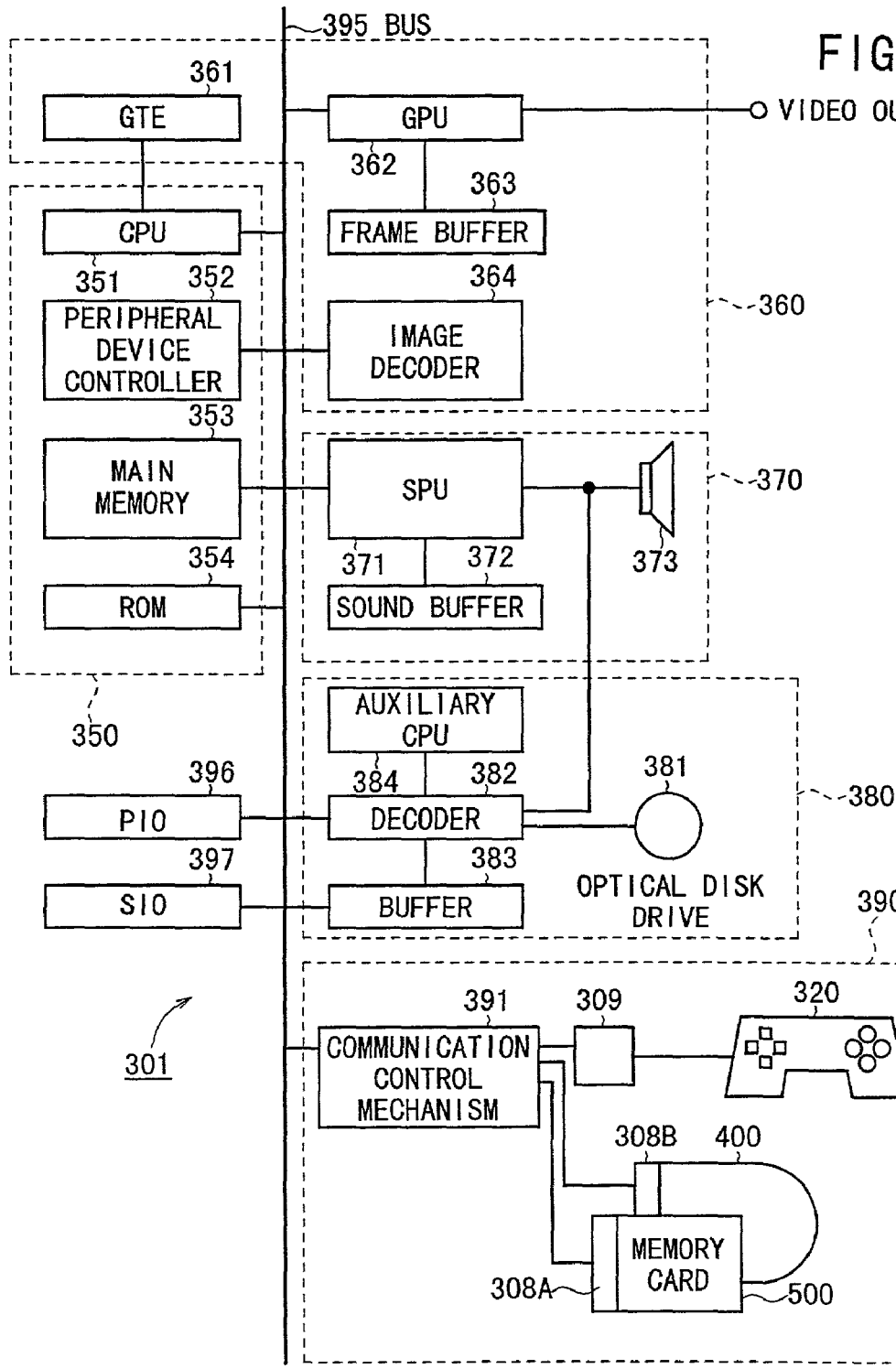
FIG. 10 is a block diagram of the video game apparatus shown in FIG. 5.
Figure 11:
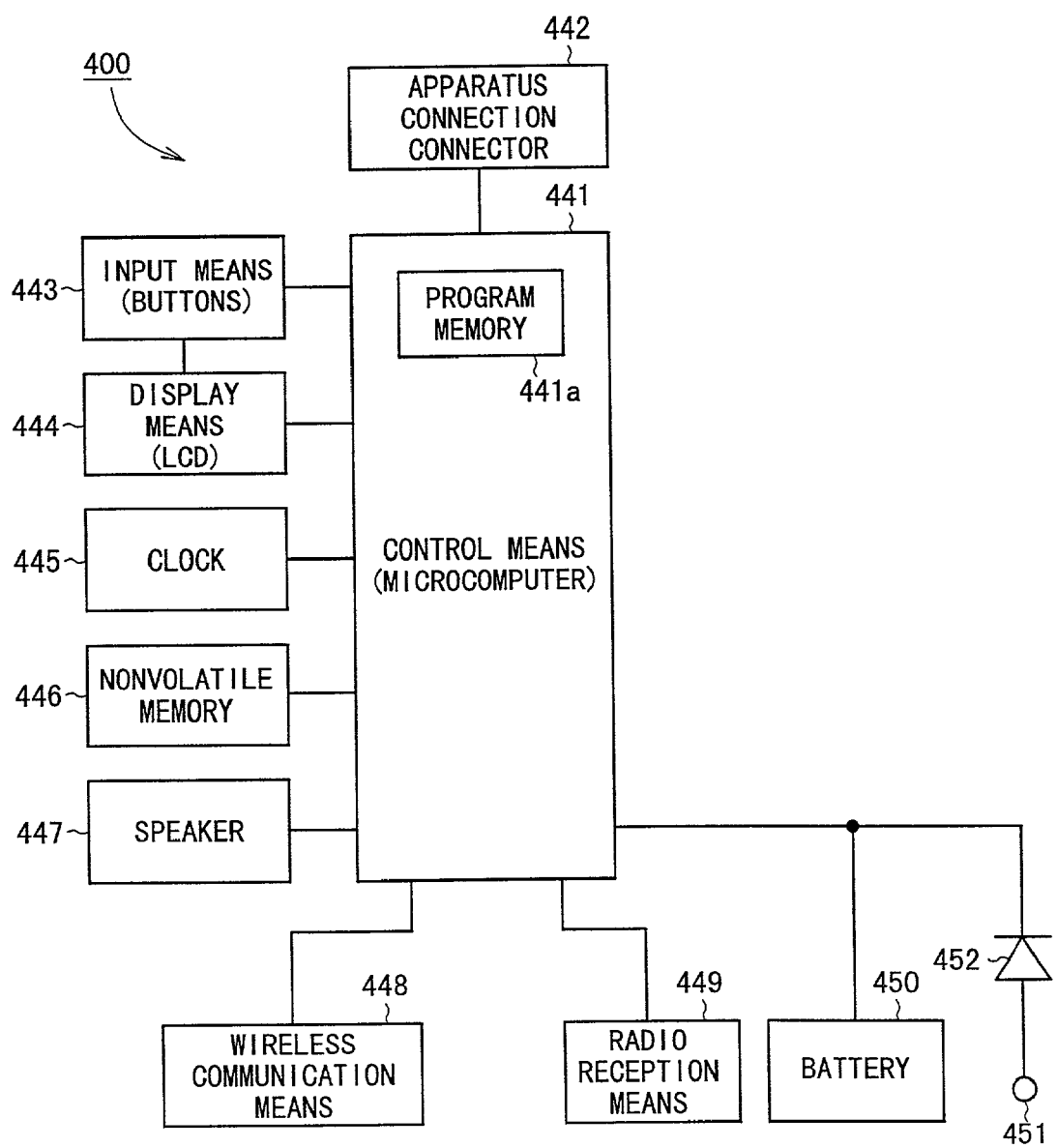
FIG. 11 is a block diagram of the portable electronic device shown in FIG. 5.

FIGS. 10 and 11 show circuit arrangements of the video game apparatus 301 and the portable electronic device 400.

As shown in FIG. 10, the video game apparatus 301 comprises a control system 350 including a central processing unit (CPU) 351 and its peripheral devices, a graphic system 360 including a graphic processing unit (GPU) 362 for plotting image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from the manual controller 320 which enter instructions from the user, and data supplied to and from the memory card 500 which stores game settings and the portable electronic device 400, a bus 395 to which the control system 350, the graphic system 360, the sound system 370, the optical disk controller 380, and the communication controller 390 are connected, a parallel I/O interface (PIO) 396 and a serial I/O interface (SIO) 397 which interface another apparatus.

The memory card 3 described above is inserted as a memory card 500 in the video game apparatus 301.

The control system 350 comprises a CPU 351, a peripheral device controller 352 for controlling direct memory access (DMA) data transfer, a main memory 353 comprising a random-access memory (RAM), and a read-only memory (ROM) 354.

The CPU 351, the graphic system 360, the main memory 353, and the ROM 354 correspond respectively to the CPU 11, the image processor 14, the RAM 12, the ROM 13 of the information processing apparatus 2.

The main memory 353 serves as a memory means for storing various data. The main memory 353 stores, as same as the RAM 12 of the information processing apparatus 2, data read from the memory card 3, i.e., boot data including a startup image display program and startup image data.

The ROM 354 serves as a memory means for storing various programs such as an operating system for controlling the main memory 353, the graphic system 360, the sound system 370, etc.

The ROM 354 originally stores, as same as the ROM 13 of the information processing apparatus 2, a boot program such as a startup image display program that will be executed by a boot sequence when the video game apparatus 301 is started up.

The CPU 351 controls the video game apparatus 301 in its entirety by executing the operating system stored in the ROM 354.

The CPU 351 has the functions of the CPU 11 of the information processing apparatus 2 described above. Specifically, when the video game apparatus 301 is turned on, the CPU 351 executes the boot program according to the boot sequence.

Then, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk. As the application program is executed, the CPU 351 controls the graphic system 360, the sound system 370, etc. depending on instructions entered from the user for thereby controlling the display of images and the generation of music sounds and sound effects.

The graphic system 360 comprises a geometry transfer engine (GTE) 361 for performing coordinate transformations and other processing, a GPU 362 for plotting image data according to commands from the CPU 351, a frame buffer 363 for storing image data plotted by the GPU 362, and an image decoder 364 for decoding image data compressed and encoded by an orthogonal transform such as a discrete cosine transform.

The graphic system 360 has the functions of the image processor 14 of the image processing apparatus 2.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process to plotting one triangular polygon with one color, for example.

With the GTE 361, the video game apparatus 301 is able to reduce the burden on the CPU 351 and perform high-speed coordinate calculations.

According to an image plotting command from the CPU 351, the GPU 362 plots a polygon or the like in the frame buffer 363. The GPU 362 is capable of plotting a maximum of 360 thousand polygons per second.

The frame buffer 363 comprises a dual-port RAM, and is capable of simultaneously storing image data plotted by the GPU 362 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it plots a polygon or the like, and a texture area for storing texture data to be subjected to coordinate transformations when a polygon is plotted and mapped onto a polygon plotted by the GPU 362. The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The optical disk controller 380 comprises an optical disk drive 381 for reproducing application programs and data recorded on an optical disk such as a CD-ROM or the like, a decoder 382 for decoding programs and data that are recorded with an error correcting code added thereto, and a buffer 383 for temporarily storing data read from the optical disk drive 381 so as to allow the data from the optical disk to be read at a high speed. An auxiliary CPU 384 is connected to the decoder 382.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM, which is recorded as 16-bit digital data, is decoded by the decoder 382 and then applied to drive the speaker 373.

The communication controller 390 comprises a communication control mechanism 391 for controlling communication with the CPU 351 via the bus 395, a controller connector 309 to which the manual controller 320 for entering instructions from the user is connected, and a pair of memory card insertion units 308A, 308B (see also FIG. 6) for receiving the memory card 500 as an auxiliary memory device for storing game settings, etc. and the portable electronic device 400, the memory card insertion units 308A, 308B being controlled by the communication control mechanism 391.

The communication controller 390 serves as an interface with the memory card 500. The video game apparatus 301 can read boot data from the memory card 500 via the communication controller 390.

The video game apparatus 301 thus constructed can play a video game based on a game program recorded on the optical disk that is mounted in the optical disk controller 380.

As shown in FIG. 11, the portable electronic device 400 comprises a control means 441, a apparatus connection connector 442, an input means 443, a display means 444, a clock function unit 445, a nonvolatile memory 446, a speaker 447, a wireless communication means 448 and a radio reception means 449 as a data transmitting/receiving means, a battery 450, and a power supply terminal 451 and a diode 452 as a power supply means.

The control means 441 comprises a microcomputer, for example. The control means 441 has a program memory 441a disposed therein as a program storage means.

The apparatus connection connector 442 serves as a connection means for connecting to a slot of another information-handling apparatus or the like. For example, the connector 442 has a data communication function for transmitting data to and receiving data from the video game apparatus 301.

The input means 443 comprises control buttons for controlling a program stored in the program memory 441a.

The display means 444 comprises a liquid crystal display unit or the like for displaying various items of information.

The clock function unit 445 is arranged to display time on the display means 444, for example.

The nonvolatile memory 446 serves to store various data. For example, the nonvolatile memory 446 comprises a semiconductor memory such as a flash memory which is capable of retaining stored data even when the portable electronic device 400 is turned off.

Since the portable electronic device 400 has the battery 450, the nonvolatile memory 446 may comprise a static random-access memory (SRAM) capable of storing and reading data at a high speed.

The battery 450 also allows the portable electronic device 400 to be operable independently even when the portable electronic device 400 is removed from the slots 307A, 307B in the casing 302 of the video game apparatus 301.

The battery 450 comprises a chargeable secondary battery. When the portable electronic device 400 is inserted in either one of the slots 307A, 307B in the casing 302 of the video game apparatus 301, the battery 450 is supplied with electric energy from the video game apparatus 301. Specifically, the battery 450 has a terminal connected to the power supply terminal 451 via a reverse-current prevention diode 452. When the portable electronic device 400 is connected to the casing 302, electric energy is supplied from the power supply terminal 451 via the reverse-current prevention diode 452 to the battery 450.

The wireless communication means 448 is arranged to perform data communication with another memory card or the like through an infrared radiation or the like.

The radio reception means 449 has an antenna, a demodulator, etc. and is arranged to receive various data transmitted by a radio broadcast.

The speaker 447 is constructed as a sound generating means for generating sounds according to a program.

The above components or means of the portable electronic device 400 are connected to the control means 441, and are operated under the control of the control means 441.

Figure 12:
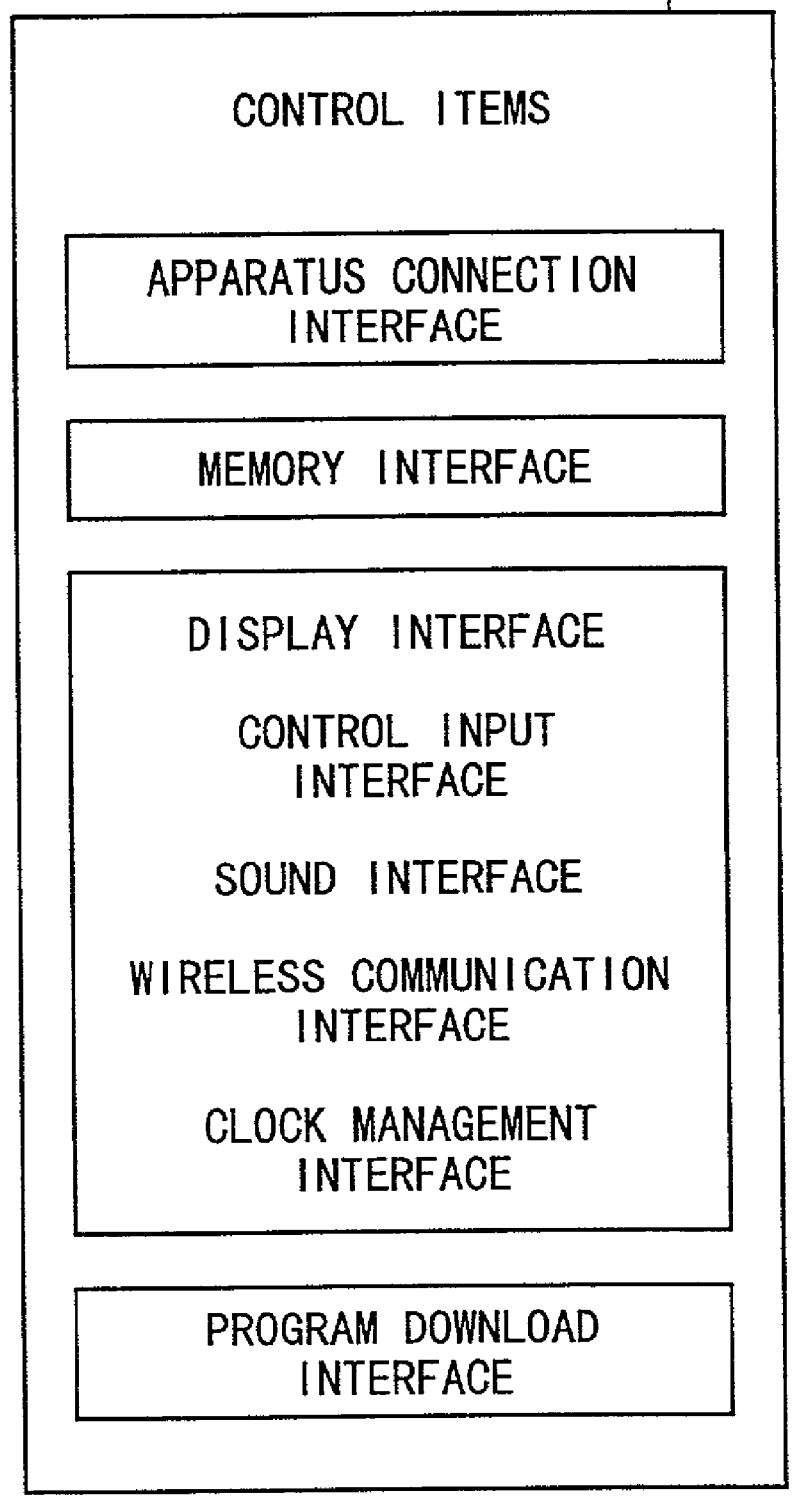
FIG. 12 is a diagram showing control items controlled by a control means in the portable electronic device shown in FIG. 11.

FIG. 12 shows control items of the control means 441. As shown in FIG. 12, the control means 441 has an apparatus connection interface for connection to an information-handling apparatus, a memory interface for outputting data to and inputting data from a memory, a display interface, a control input interface, a sound interface, wireless communication interface, a clock management interface, and a program download interface.

The portable electronic device 400, which has the input means 443 such as button switches for controlling a program to be executed and the display means 444 such as a liquid crystal display (LCD) unit, also serves as a portable game device when a game application is executed.

The portable electronic device 400 has a function to download an application program from the video game apparatus 301 and store the downloaded application program into the program memory 441a in the microcomputer 441. With such a function, it is possible to change application programs and various driver software that operate on the portable electronic device 400.

The video game apparatus 301 and the portable electronic device 400 thus constructed jointly make up the video entertainment system.

In the video entertainment system, the video game apparatus 301 can execute a boot program stored in the memory card 500 when it is started up.

In the memory card 500 inserted in the video game apparatus 301, game data is stored in the data block thereof. A startup image display program and startup image data are stored in the startup image display program storage block of the memory card 500. When the video game apparatus 301 is started up, a demonstration image of the video game can be displayed as a startup image according to the startup image display program and startup image data which are stored in the memory card 500. The startup image displayed according to the startup image display program and startup image data is not limited to a video game image, but may contain an advertisement or the like, as described above.

A method of starting up an information processing apparatus according to the present invention has the steps of transmitting boot data, to be executed according to a boot sequence by an information processing apparatus which executes a program to process data, stored in a recording medium that is removably inserted in the information processing apparatus to the information processing apparatus, and booting the information processing apparatus according to the booting sequence based on the boot data transmitted from the recording medium. In the transmitting step, a boot program is transmitted from the recording medium to the information processing apparatus. In the booting step, the information processing apparatus executes the transmitted boot program.

Since the boot data is determined depending on the recording medium, the information processing apparatus is capable of being started up without using constant data.

A recording medium according to the present invention has a memory means for storing boot data to be executed according to a boot sequence by the information processing apparatus when the information processing apparatus is booted, and a transmitting means for transmitting the boot data stored by the memory means to the information processing apparatus. Consequently, a boot program, stored in the memory means, to be executed when the information processing apparatus is booted can be transmitted to the information processing apparatus by the transmitting means.

Because the boot data is determined depending on the recording medium, the information processing apparatus is capable of being started up without using constant data.

An information processing apparatus according to the present invention has a reading means for reading boot data, to be executed when the information processing apparatus is booted, stored in a recording medium, a boot data storage means for storing the boot data read from the recording medium, and a booting means for executing the boot data stored in the boot data storage means according to a boot sequence. A boot program, stored in the recording medium, to be executed when the information processing apparatus is booted can be read into the boot data storage means by the reading means, and the boot data stored in the boot data storage means can be executed according to the boot sequence by the booting means.

Inasmuch as the boot data is determined depending on the recording medium, the information processing apparatus is capable of being started up without using constant data.

A method of starting up an information processing apparatus according to the present invention has the step of executing boot data, to be executed according to a boot sequence by an information processing apparatus which executes a program to process data, stored in a recording medium that is removably inserted in the information processing apparatus, according to the boot sequence.

Since the boot data is determined depending on the recording medium, the information processing apparatus is capable of being started up without using constant data.

Although a certain preferred embodiment of the present invention has been shown and described in detail, it should be understood that various changes and modifications may be made therein without departing from the scope of the appended claims.

What is claimed is:

1. An information processing apparatus comprising:
 a processor for executing a booting program to start up said information processing apparatus;
 a non-removable data storage located in said information processing apparatus for storing said booting program and first data accessible by said booting program; and
 another data storage for storing second data accessible by said booting program, the other data storage comprising a recording medium removably connected to said information processing apparatus,
 wherein said processor selectively uses said first data stored in said non-removable data storage or said second data stored in said other data storage according to said booting program to start up said information processing apparatus, said other data storage being capable of data communication with said information processing apparatus,
 wherein said first data and said second data are startup image data, and
 wherein said processor selectively displays an image of said first data or an image of said second data on a display according to said booting program in starting up said information processing apparatus before an application program is executed.

2. An information processing apparatus according to claim 1, wherein said second data includes at least one of image data and sound data.

3. An information processing apparatus according to claim 1, wherein said processor displays an image of said first data on a display in starting up said information processing apparatus when said recording medium is not connected to said information processing apparatus, and said processor displays an image of said second data on said display in starting up said information processing apparatus when said recording medium is connected to said information processing apparatus.

4. An information processing apparatus according to claim 1, wherein the other data storage for storing said second data is a portable electronic device.

5. An information processing apparatus comprising:
- a processor for executing a booting program to start up said information processing apparatus; and
- a communication unit for data communication with a plurality of data storages for storing data, one of said data storages being a non-removable data storage located in said information processing apparatus for storing said booting program, and at least one other of said data storages being capable of data communication with said information processing apparatus,
- wherein said processor selectively uses said data stored in said plurality of data storages according to said booting program to start up said information processing apparatus,
- wherein said data stored in said plurality of data storages are startup image data, and
- wherein said processor selectively displays an image of said data stored in said plurality of data storages on a display according to said booting program in starting up said information processing apparatus before an application program is executed.

6. An information processing apparatus according to claim 5, wherein the at least one other of said data storages is a portable electronic device.

7. An information processing apparatus according to claim 5,
- wherein said data stored in said plurality of data storages are image data, and
- wherein said processor sequentially displays images of said data stored in said plurality of data storages on a display according to said booting program in starting up said information processing apparatus.

8. A method of starting up an information processing apparatus, comprising the steps of:
- executing a booting program;
- selecting data from first data stored in a non-removable data storage of said information processing apparatus and second data stored in another data storage according to said booting program, wherein the other data storage for storing said second data comprises a recording medium removably connected to said information processing apparatus, said other data storage being capable of data communication with said information processing apparatus;
- starting up said information processing apparatus using the selected data, wherein said first data and said second data are startup image data; and
- displaying an image of the selected image data on a display according to said booting program in starting up said information processing apparatus before an application program is executed.

9. A method according to claim 8, wherein said second data includes at least one of image data and sound data.

10. A method according to claim 8, wherein an image of said first data is displayed on a display in starting up said information processing apparatus when said recording medium is not connected to said information processing apparatus, and an image of said second data is displayed on said display in starting up said information processing apparatus when said recording medium is connected to said information processing apparatus.

11. A method according to claim 8, wherein the other data storage for storing said second data is a portable electronic device.

12. A method of starting up an information processing apparatus, comprising the steps of:
- executing a booting program;
- establishing data communication with a plurality of data storages for storing data, one of said data storages being a non-removable data storage located in said information processing apparatus for storing said booting program;
- selecting data from data stored in said plurality of data storages according to said booting program, at lest one other of said data storages being capable of data communication with said information processing apparatus;
- starting up said information processing apparatus using the selected data, wherein said data stored in said plurality of data storages are image data; and
- displaying an image of the selected data on a display according to said booting program in starting up said information processing apparatus before an application program is executed.

13. A method according to claim 12, wherein at least one of said plurality of data storages is a portable electronic device.

14. A method according to claim 12, further comprising the step of:
- displaying images of said data stored in said plurality of data storages sequentially on a display according to said booting program in starting up said information processing apparatus.

15. A method of starting up en information processing apparatus, comprising the steps of:
- transmitting variable boot data to the information processing apparatus, to be executed according to a boot sequence by the information processing apparatus which executes a program to process data, said variable boot data being stored in a recording medium that is removably inserted in the information processing apparatus;
- storing invariable boot data in a non-removable boot execution storage means located in the information processing apparatus;
- selectively booting the information processing apparatus according to the booting sequence based on one of said variable boot data transmitted from said recording medium and said invariable boot data in said boot execution storage means; and
- displaying an image on a display according to the selected booting operation in starting up said information processing apparatus before an application program is executed.

16. A method according to claim 15, wherein said information processing apparatus has transmission data storage means for storing the boot data transmitted from said recording medium.

17. A method according to claim 15, wherein said recording medium comprises a memory card having control means for managing data.

18. A method according to claim 15, wherein said information processing apparatus comprises a video game apparatus.

19. A recording medium for storing data, which is removably inserted in an information processing apparatus winch executes a program to process data, said recording medium comprising:
- memory means for storing variable boot data to be executed according to a boot sequence by the information processing apparatus when the information processing apparatus is booted;
- transmitting means for transmitting the boot data stored by said memory means to said information processing apparatus; and
- control means for managing data,
- wherein said information processing apparatus comprises a non-removable data storage for storing invariable boot data and a booting program for executing said boot sequence, said booting program selectively booting the information processing apparatus according to the booting sequence based on one of said variable boot data transmitted from said recording medium and said invariable boot data and displaying an image on a display according to the selected booting operation in starting up said information processing apparatus before an application program is executed.

20. A recording medium according to claim 19, wherein said recording medium comprises a memory card for storing data generated by said information processing apparatus.

21. A recording medium according to claim 19, wherein said information processing apparatus comprises a video game apparatus.

22. An information processing apparatus for processing data, comprising:
- a removable storage means comprising a recording medium removably inserted in said information processing apparatus, said recording medium storing variable boot data;
- boot execution storage means for storing boot data to be executed according to a boot sequence as invariable boot data;
- reading means for reading said variable boot data, to be executed when the information processing apparatus is booted, stored in said recording medium;
- boot data storage means, comprising a non-removable data storage means located in said information processing apparatus, for selectively storing said invariable boot data or the boot data read from said recording medium; and
- booting means for executing the boot data stored in said boot data storage means according to a boot sequence and for displaying an image on a display according to the boot data stored in said boot data storage means in starting up said information processing apparatus before an application program is executed.

23. An information processing apparatus according to claim 22, wherein said recording medium comprises a memory card having control means for managing data.

24. An information processing apparatus according to claim 22, wherein the information processing apparatus comprises a video game apparatus.

* * * * *